R. KOEHLER.
LOCKING DEVICE.
APPLICATION FILED NOV. 20, 1915.
1,287,343.
Patented Dec. 10, 1918.
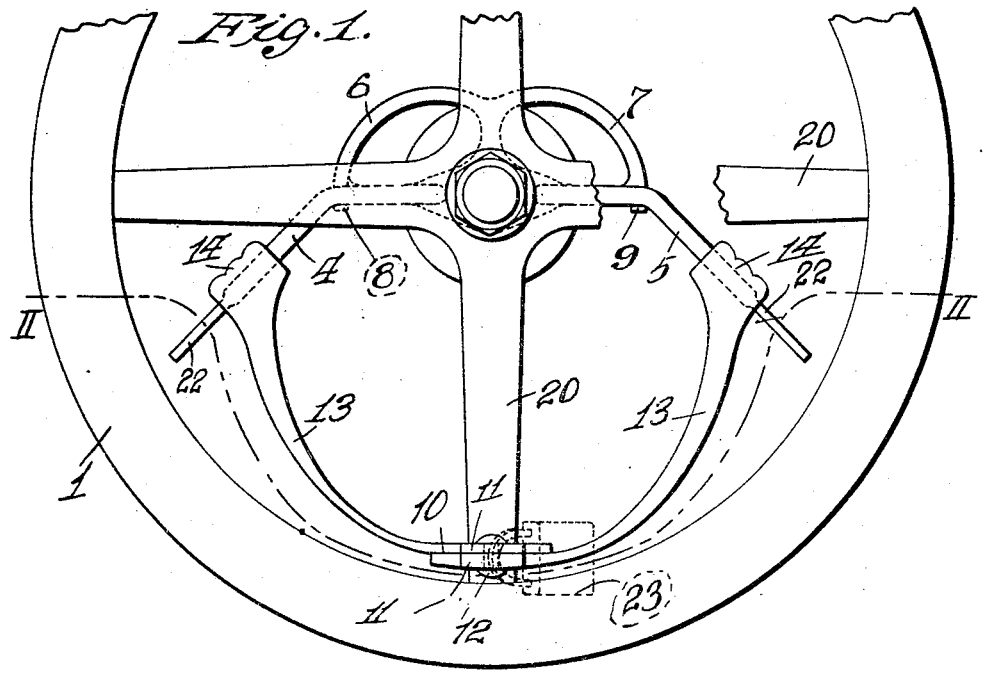
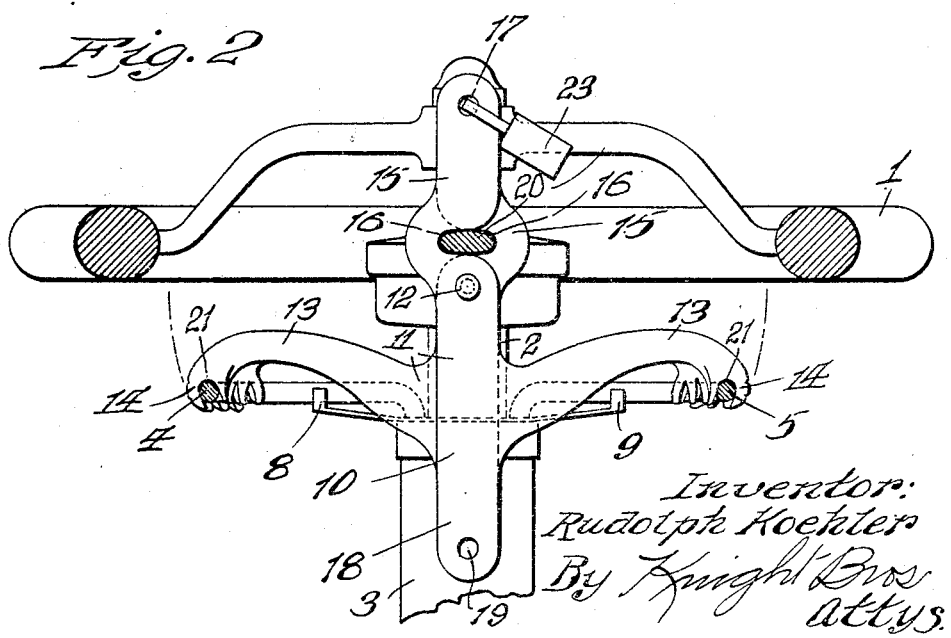
Inventor:
Rudolph Koehler
By Knight Bros
attys.

UNITED STATES PATENT OFFICE.

RUDOLPH KOEHLER, OF ST. LOUIS, MISSOURI.

LOCKING DEVICE.

1,287,343.  Specification of Letters Patent.  Patented Dec. 10, 1918.

Application filed November 20, 1915. Serial No. 62,467.

*To all whom it may concern:*

Be it known that I, RUDOLPH KOEHLER, a citizen of the United States of America, residing in the city of St. Louis and State of Missouri, have invented certain new and useful Improvements in Locking Devices for locking the motor-control levers of the engine and steering-gear of an automobile together, of which the following is a specification.

The primary object of this invention is to provide a locking device that is applicable to the steering wheel of an automobile which when set in a position of locking will securely grip the engine control levers, commonly known as the carbureter lever and the spark control lever, and also the steering wheel in a set immovable position.

It is known that there are now in use devices that are adapted to lock and prevent the engine control levers from being moved, but it has been found that in such devices a certain amount of movement can be given to the levers so that the engine can be operated so as to give power enough so as to allow the automobile to be driven away by an unlawful operator.

With this improved device in which the steering wheel is locked as well as the engine control levers, it is impossible for an unlawful operator to manipulate the automobile.

Other and further objects will appear in the specification, and be specifically pointed out in the appended claims, reference being had to the accompanying drawings exemplifying the invention, and in which, Figure 1 is a fragmentary plan view of the steering wheel of an automobile showing the engine control levers, this improved locking device being locked to the wheel and levers.

Fig. 2 is a sectional elevation taken on the line II—II of Fig. 1.

Referring by numerals to the accompanying drawings, 1 designates a steering wheel which is mounted to the upper end of the steering post 2, said post being mounted in the post support 3. Operably mounted in the post support 3 is a carbureter control lever 4 and a spark control lever 5, said levers are mounted on the respective quadrants 6 and 7 and are adapted to abut stops 8 and 9 respectively when they are moved forwardly. Figs. 1 and 2 show the locking device 10 in a locked position, said locking device comprising a pair of swingingly mounted members 11 which are pivotally mounted together as shown at 12. Each of said members 11 have an extending arm 13 formed thereon, and formed on the outer end of each of said arms is a claw or gripping portion 14. Each of the members 11 has an upwardly extending portion 15 formed thereon, and formed in each of said portions 15 above the pivot 12 is a recess 16, said recesses 16 being opposed.

Formed in each of the extending portions 15 is an opening 17 and formed in each of the depending portions 18 of the members 11 is an opening 19.

This improved locking device merely comprises the members 11 which are swingingly mounted together at 12 and is adapted to be wholly detachable from the parts which it is adapted to lock. In mounting this improved locking device in a position of locking, it is necessary to have one of the spokes 20 of the steering wheel 1 in a position approximately mid-way between the control levers 4 and 5.

The members 11 of the locking device 10 are swung upwardly which will cause the upwardly extending portions 15 of said members to be moved apart similar to the blades of a pair of scissors in which the recesses 16 will be moved away from each other. This will allow for the upwardly extending portions 15 to straddle the spoke 20 of the wheel. The members 15 are then swung together, and the recesses 16 of said members are then engaged over the aforesaid spoke as shown more clearly in Fig. 2. Coincident with this closing action relative to the members 15, the arms will be swung downwardly and the recess 21, which is formed in the gripping portion of each of said arms, will be engaged over the forwardly extending portions 22 of the control levers 4 and 5, the control levers of course being previously moved against their stops 8 and 9. A lock such as 23 is then engaged in the openings 17 which aline with each other, said lock holding the locking device 10 in a fixed position in which the spoke 20 of the steering wheel is firmly gripped and immovable as well as the control levers 4 and 5 being firmly gripped and held secure by the claw or gripping portions 14 of the arms 13. If desired, the lock 23 can be engaged in the alining openings 19 of the depending portions 18 in accordance with the desires of the operator.

It is obvious that a device of this character can be given a different formation in the manufacture thereof in order to engage differently formed and positioned parts relative to the steering wheel and control levers of different types of automobiles, the essential feature however of this innvention being to provide a three-in-one lock relative to a pair of control levers and a steering wheel.

What I claim is:

1. In combination, a steering wheel, a locking device and a pair of engine control levers oppositely disposed on each side of the steering post of said wheel, said locking device comprising movably mounted members pivoted to each other, said members of said device when moved into a locking position adapted to engage said steering wheel and said levers.

2. In combination, a steering wheel, a locking device and a pair of engine control levers oppositely disposed on each side of the steering post of said wheel, said locking device comprising a pair of members swingingly mounted to each other, engaging portions formed on said members, means for locking said members together, said members when moved into their locked together positions adapted to have said engaging portions thereof engage said steering wheel and said levers.

3. In combination, a steering wheel, a locking device and a pair of engine control levers, said levers located beneath said wheel, said locking device comprising a pair of members swingingly mounted to each other, engaging portions formed on said members adapted to the same radial travel, said engaging portions of said members when swung toward a locking position adapted to engage said steering wheel and said levers.

4. A locking device for the steering wheel and engine control levers of an automobile comprising a pair of members swingingly mounted to each other, an outwardly extending portion formed on each of said members, a recess formed on each of said extending portions, a vertically arranged portion formed on each of said members, a recess formed in each of said vertical portions, said outwardly extending portions when swung downwardly adapted to have their recesses engage said engine control levers, said recesses of said vertically extending portions adapted to engage a spoke of said steering wheel.

5. A vehicle lock comprising a pair of foldable members, one of said members having means formed at one end for engaging one of the levers on one side of the steering post of a steering wheel, said other member having means at one end for engaging the other lever on the other side of the steering post, and means formed adjacent the opposite ends of said members for engaging a portion of said steering wheel.

6. The combination with pivoted levers and a steering wheel, of a pair of pivotally mounted members, each provided with an engaging portion for engagement with said respective levers, and means formed on said members for engagement with a spoke of said wheel.

RUDOLPH KOEHLER.

Copies of this patent may be obtained for five cents each, by addressing the "Commissioner of Patents, Washington, D. C."